United States Patent [19]

Thornburgh

[11] Patent Number: 4,605,426
[45] Date of Patent: Aug. 12, 1986

[54] INSULATED ENGINE AIR CLEANER

[75] Inventor: William F. Thornburgh, Rochester Hills, Mich.

[73] Assignee: General Motors Corporation, Detroit, Mich.

[21] Appl. No.: 760,170

[22] Filed: Jul. 29, 1985

[51] Int. Cl.⁴ .............................................. B01D 35/30
[52] U.S. Cl. ...................................... 55/267; 55/276; 55/510; 55/DIG. 28
[58] Field of Search ................ 55/276, 267, 498, 510, 55/385 B, DIG. 28

[56] References Cited

U.S. PATENT DOCUMENTS

| | | | |
|---|---|---|---|
| 3,464,223 | 9/1969 | Roberts et al. | 55/269 |
| 3,483,980 | 12/1969 | Cochran et al. | 55/269 |
| 3,859,067 | 1/1975 | Dasek et al. | 55/269 |
| 3,990,414 | 11/1976 | Malphettes | 55/276 |
| 4,083,184 | 4/1978 | Ushijima et al. | 55/276 |
| 4,129,427 | 12/1978 | Harris | 55/269 |
| 4,236,901 | 12/1980 | Kato et al. | 55/276 |

*Primary Examiner*—Alan Cohan
*Assistant Examiner*—John A. Rivell
*Attorney, Agent, or Firm*—R. L. Phillips

[57] ABSTRACT

An engine air cleaner is disclosed having a housing with an inlet and an outlet and a filter therebetween. A vacuum chamber is formed in the housing so as to surround the inlet, outlet and filter and is connected to an engine intake manifold so as to establish a subatmospheric pressure therein to thereby vacuum insulate the air cleaner for both heat transfer and noise attenuation with respect to the air passing therethrough.

3 Claims, 2 Drawing Figures

INSULATED ENGINE AIR CLEANER

TECHNICAL FIELD

This invention relates to insulated air cleaners and more particularly to means for reducing both the noise emitted by and the heat transfer with the air passing therethrough.

BACKGROUND OF THE INVENTION

In motor vehicles, it is desirable to minimize the heat transfer between the ambient engine compartment air and the air being admitted to the engine whether the engine intake air be cold or is heated such as by the exhaust manifold. In the former case, it is desirable to reduce the heat transfer from the engine compartment air to the engine intake air to improve engine performance. On the other hand, in the latter case the objective is to reduce heat loss from the heated engine intake air to the engine compartment air to allow a desired calibrated engine air intake temperature to be reached sooner. Heretofore the practice has been to use various insulation materials for both heat transfer reduction and noise attenuation as well as various mechanical muffler devices with respect to the latter. While such arrangements have generally proven satisfactory, they have been found in light of the discovery of the present invention to be relatively costly and complex particularly with respect to noise attenuation.

SUMMARY OF THE PRESENT INVENTION

The present invention provides a cost-effective solution by forming the air cleaner with a double wall structure that defines a chamber extending about the air cleaner's inlet, outlet and filter element and then utilizing already available engine manifold vacuum to evacuate this chamber to thereby effect a highly efficient noise and heat transfer barrier. Preferably, a check valve is provided in the vacuum line to the air cleaner vacuum chamber such that the maximum manifold vacuum is trapped therein so that the maximum heat insulation and noise attenuation is obtained from the available insulation space by this available insulation aiding source. Furthermore, it will be shown that this vacuum can also be used to aid sealing by the air cleaner's cover seal.

These and other objects, advantages and features of the present invention will become more apparent from the following description and drawings of the preferred embodiment in which:

DETAILED DESCRIPTION OF THE PREFERRED EMBODIMENT

Figure 1:
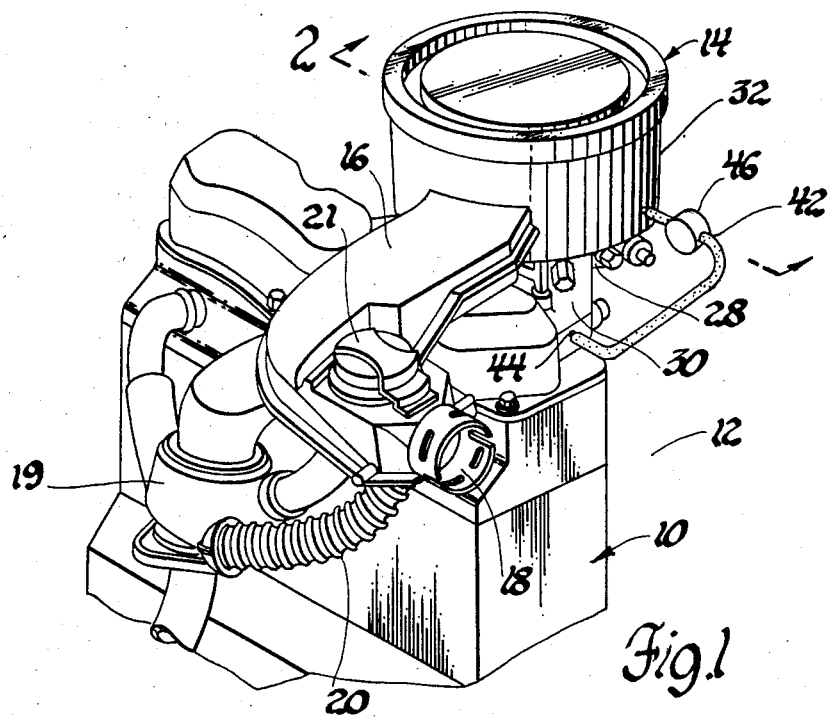
FIG. 1 is an isometric view of a portion of a vehicle engine with the vacuum insulated air cleaner of the present invention mounted thereon.
Figure 2:
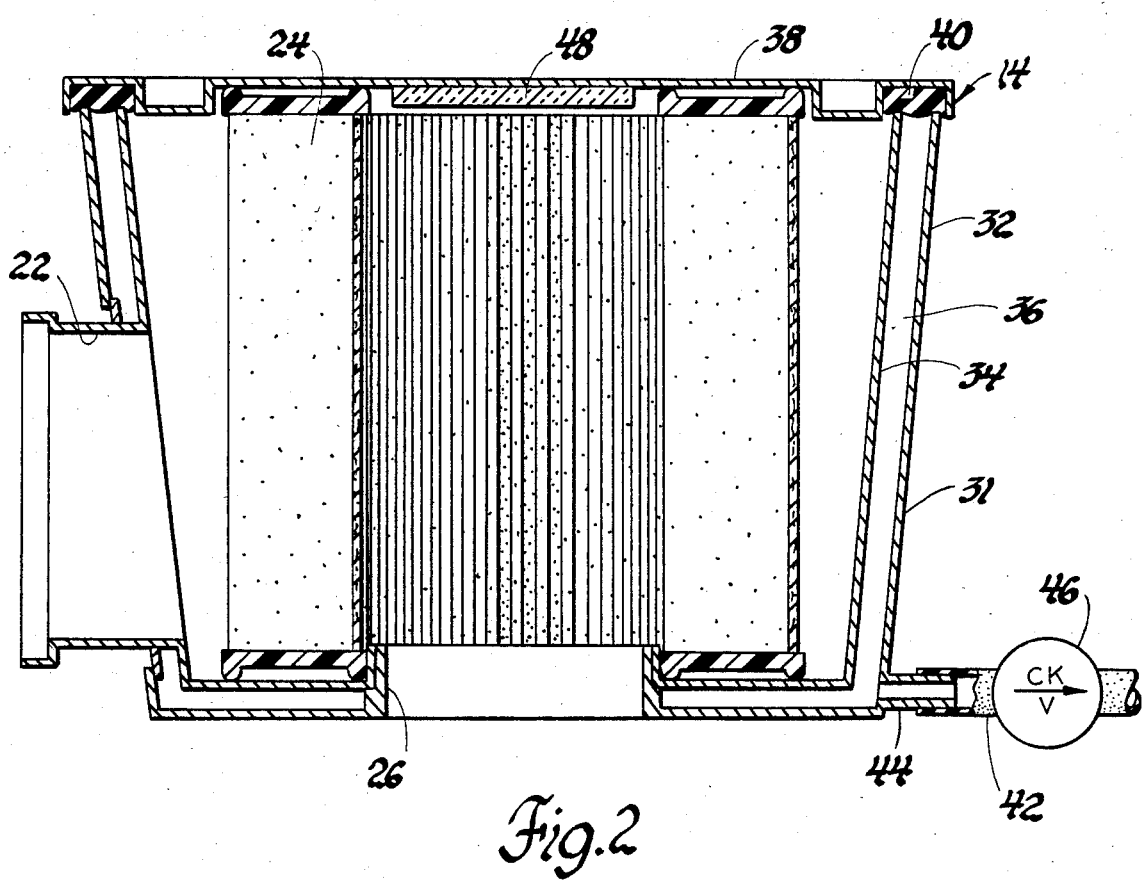
FIG. 2 is an enlarged sectional view taken on the line 2—2 in FIG. 1.

Referring to FIG. 1, there is shown an engine 10 mounted in a vehicle compartment 12 whose outline is not shown. Mounted atop the engine is an air cleaner 14 having an inlet duct 16 to which outside or relatively cold air is delivered through a cold air connection 18 and to which heated or relatively hot air may also be delivered from an exhaust manifold stove 19 and via a duct 20 under the control of a temperature responsive valve 21 of conventional design. At the air cleaner as shown in FIG. 2, the air enters through a circular side inlet 22 and passes through a ring-shaped filter 24 and exits through a circular bottom outlet 26 to a carburetor 28 and thence a manifold 30 which distributes the air-fuel mixture to the engine cylinders.

The housing of the air cleaner has a truncated cone shape and comprises a hollow walled case 31 formed with an outer wall 32 and an inner wall 34 which define therebetween a vacuum chamber 36 that extends about the air passage through the air cleaner and in particularly circumferentially surrounds the air cleaner's inlet 22, filter 24 and outlet 26. A cover 38 closes the top of the air filter and is sealed thereto by a ring-shaped elastomeric seal 40 that seats on the upper edges of the two case walls 32 and 34 and is thus exposed therebetween to the vacuum chamber 36.

The air cleaner vacuum chamber 36 is connected to the intake manifold 30 by a hose 42 attached to a nipple 44 that is formed on the outer wall 32 and opens through same to the vacuum chamber. Moreover, a check valve 46 is installed in the air cleaner vacuum line 42 so that the maximum manifold vacuum is trapped in the air cleaner vacuum chamber 36 to thereby obtain the maximum reduction in heat transfer and noise attenuation insulation from the available space. Furthermore, it will be observed that the vacuum on the cover seal acts to aid not only tight sealing of the vacuum chamber but also tight sealing of the cover 38 with respect to the filter. Then for even further insulation, there may be added an insulation pad 48 secured to the underside of the cover 38 centrally of the air filter. Furthermore, it will be appreciated that the air cleaner inlet and outlet may be reversed dependent on the installation without significantly affecting the performance of the air cleaner's insulating vacuum chamber.

The above described preferred embodiment is illustrative of the invention which may be modified within the scope of the appended claims.

The embodiments of the invention in which an exclusive property or privilege is claimed are defined as follows:

1. In an engine air cleaner having a housing with an inlet and an outlet and a filter mounted in an air passage therebetween, the improvement comprising said housing having double wall means forming a vacuum chamber extending about said filter, and vacuum establishing means for establishing a subatmospheric pressure in said chamber to thereby vacuum insulate the air cleaner for both heat transfer and noise attenuation with respect to the air passing therethrough.

2. In an engine air cleaner having a housing with an inlet and an outlet and a filter therebetween, the improvement comprising said housing having double wall means forming a vacuum chamber extending about said inlet and outlet and filter, and vacuum establishing means for establishing a subatmospheric pressure in said chamber to thereby vacuum insulate the air cleaner for both heat transfer and noise attenuation with respect to the air passing therethrough.

3. In an air cleaner having a housing with an inlet and an outlet and a filter mounted in an air passage therebetween for delivering filter air to an intake manifold of an engine, the improvement comprising said housing having double wall means forming a vacuum chamber extending about said inlet and outlet and filter and vacuum line means including a check valve for connecting said chamber to said intake manifold so as to establish and maintain a subatmospheric pressure in said chamber to thereby vacuum insulate the air cleaner for both heat transfer and noise attenuation with respect to the air passing therethrough.

* * * * *